United States Patent
Chemisky et al.

(10) Patent No.: US 11,456,777 B2
(45) Date of Patent: Sep. 27, 2022

(54) DATA RECORDING DEVICE WITH A HART MULTIPLEXER

(71) Applicant: Siemens Aktiengesellschaft, Munich (DE)

(72) Inventors: Eric Chemisky, Soultz sous forets (FR); Siva Prasad Katru, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/466,049

(22) Filed: Sep. 3, 2021

(65) Prior Publication Data
US 2022/0077892 A1 Mar. 10, 2022

(30) Foreign Application Priority Data
Sep. 7, 2020 (DE) .......................... 102020211217.7

(51) Int. Cl.
| | |
|---|---|
| *H04B 5/00* | (2006.01) |
| *H04L 29/08* | (2006.01) |
| *G05B 15/02* | (2006.01) |
| *H04L 67/12* | (2022.01) |

(52) U.S. Cl.
CPC ......... *H04B 5/0012* (2013.01); *H04B 5/0031* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 6,904,327 B2* | 6/2005 | Balakrishnan | ..... | G05B 19/4185 700/95 |
| 7,010,294 B1* | 3/2006 | Pyotsia | ................ | G05B 19/042 455/3.03 |
| 7,191,021 B2* | 3/2007 | Prasad | ............... | G05B 19/0423 700/20 |
| 7,876,722 B2* | 1/2011 | Hodson | ................... | H04L 67/12 455/445 |

(Continued)

FOREIGN PATENT DOCUMENTS

EP 0964325 12/1999

*Primary Examiner* — Tuan A Tran
(74) *Attorney, Agent, or Firm* — Cozen O'Connor

(57) ABSTRACT

A data recorder contains a HART multiplexer with channels that are provided with coupling members for capacitive coupling to multiple HART field devices supplied via current loops, wherein a HART modem is arranged downstream of the HART multiplexer, and downstream of the HART modem is a processor with an interface that controls HART communication of the data recorder, where to automatically and quickly identify changes in the connection configuration of field devices capacitively connected to the HART multiplexer, a pulse discriminator is connected at each channel that detects signal pulses induced by the loop current on the channel being interrupted and/or switched on and which differ from HART signals and upon detection generates an interrupt signal for the processor, and in response to the interrupt signal, the processor terminates HART communications on the channel and generates a HART command for requesting identification of a HART field device on the channel.

8 Claims, 2 Drawing Sheets

(56) References Cited

U.S. PATENT DOCUMENTS

| | | | | |
|---|---|---|---|---|
| 7,889,747 B2* | 2/2011 | Hodson | .................. | H04L 69/08 |
| | | | | 370/466 |
| 7,965,664 B2* | 6/2011 | Hodson | ............. | G05B 19/4185 |
| | | | | 370/328 |
| 8,451,809 B2* | 5/2013 | Pratt, Jr. | ............. | H04W 56/002 |
| | | | | 370/349 |
| 8,570,922 B2* | 10/2013 | Pratt, Jr. | ................ | H04L 67/12 |
| | | | | 370/310 |
| 8,676,219 B2* | 3/2014 | Pratt, Jr. | ............... | G01D 21/00 |
| | | | | 455/426.2 |
| 8,761,196 B2* | 6/2014 | Law | .................... | H04L 41/0803 |
| | | | | 370/464 |
| 9,178,967 B2* | 11/2015 | Sin | .......................... | H04L 69/08 |
| 9,203,665 B1* | 12/2015 | Haran | ..................... | H04B 3/04 |
| 9,495,313 B2* | 11/2016 | Burr | .................... | G06F 13/4282 |
| 10,281,887 B2* | 5/2019 | Blair | ...................... | H04L 67/10 |
| 10,341,293 B2* | 7/2019 | Koniki | ................... | H04L 12/66 |
| 10,531,255 B2* | 1/2020 | Bhagwani | ............. | H04W 16/18 |
| 10,725,443 B2* | 7/2020 | Griech | ................ | G05B 19/042 |
| 2013/0151020 A1* | 6/2013 | Manninen | ................ | G05D 7/00 |
| | | | | 700/282 |
| 2015/0156286 A1* | 6/2015 | Blair | ................ | H04L 12/40006 |
| | | | | 709/201 |
| 2017/0366196 A1* | 12/2017 | Lovell | ..................... | H03C 3/00 |
| 2019/0384249 A1* | 12/2019 | Gopisetti | ........... | G05B 19/4186 |

\* cited by examiner

DATA RECORDING DEVICE WITH A HART MULTIPLEXER

BACKGROUND OF THE INVENTION

1. Field of the Invention

The invention relates to a data recording device with a HART multiplexer for capacitively coupling multiple HART field devices.

2. Description of the Related Art

In process industry plants, e.g., in the chemical industry, petrochemical industry, pharmaceutical industry, food industry and industries producing other products, at the field level, spatially distributed, decentralized field devices perform predefined functions as part of plant automation and in so doing exchange process information, plant information and/or device-relevant information with components of a higher-level control and management system, and also with one another as required. The field devices include sensors (measuring transducers) for fill level, flow rate, pressure and temperature, for example, which transmit information in the form of measurement values of process variables, and actuators, e.g., actuating drives or positioners for valves, which obtain information in the form of position values, in order to influence the process.

A common communication protocol for transferring the information is Highway Addressable Remote Transducer (HART), in which the main process value, i.e., the actual measurement value or position value, is transferred via a current loop (two-wire line) as an analog 4-20 mA current signal, with further data (HART information) being able to be modulated onto and digitally transferred to the current signal via frequency shift keying (FSK) between HART frequencies 1200 Hz and 2200 Hz. The digital HART information may involve commands, responses, parameters and variables, such as a temperature measurement value of the field device. Field devices operating in accordance with the HART standard are also referred to as HART devices.

The HART protocol distinguishes between master and slave devices, where the HART field devices are generally slaves that respond to commands from the master. Typical masters are decentralized input/output modules of automation systems, manual operating devices or parameterization PCs with HART modem, which can be temporarily connected to the two-wire line in a point-to-point connection for commissioning and diagnostics of a field device.

HART-capable input/output modules of automation systems enable a permanent point-to-point connection, but many automation systems lack such direct access to HART information. Retrofitting conventional input/output modules with HART-capable I/O cards can involve considerable financial outlay. Consequently, it is instead possible for HART multiplexers to be used, which concentrate the HART information from multiple HART field devices and make it available to the automation system via standardized field bus interfaces (EP 0 964 325 A1). In order to avoid influencing the 4-20 mA current signals, the channels of the HART multiplexer are preferably coupled to the various two-wire lines in a capacitive manner. The transfer capacity that is, in any case, already low due to the multiplex operation is reduced further when, in order to reduce the device-related outlay and the costs associated therewith, multiple HART channels are assigned to only one HART modem—which is often the case.

When commissioning and starting up, the user starts a scan of the field devices connected to the HART multiplexer, where all HART information is read periodically and the individual field devices are identified (HART command 0: Read Transmitter Unique Identifier). Depending on the number of connected field devices, this may take multiple minutes for the above-described given reasons. If a field device is subsequently removed, replaced or a new field device is connected, then the scan must be repeated manually, because the automation system otherwise has no information regarding the changes made. Without manually triggering the scan, the automatic detection of a newly connected or replaced device may last multiple minutes, hours or days, meaning that the data delivered in the meantime does not correspond to the real, new configuration. Due to the capacitive coupling to the two-wire lines, it is not possible to capture the loop current in order to identify a change in the connection configuration of the field devices.

The following situations are possible:

A field device is removed. The automation system only identifies the configuration change minutes, hours or even days later during a new scan, when it does not obtain a response to the HART command 0 once a predefined time has elapsed. In fact, it is specifically recommended to set the scan period to one day, for example, in order to reduce the communication load and to accelerate the reading of important HART information, such as primary HART variables (PV) for the purpose of secondary process monitoring (condition monitoring).

An existing field device is replaced by a new field device. Here too, the automation system only identifies the change later, when it obtains the long address of the new field device in response to the HART command 0.

A new field device is connected to a previously unoccupied channel of the multiplexer. It is recommended to deactivate unoccupied channels to accelerate overall communication. With a deactivated channel, it will therefore not even be possible to detect the newly connected field device in the first place. If the unoccupied channel is not deactivated, then the change is only identified later, as in the aforementioned cases.

Although the user can himself start a scan after each change in the configuration, manual intervention is still involved.

SUMMARY OF THE INVENTION

In view of the foregoing, it is therefore an object of the invention to identify a change in the connection configuration of field devices capacitively connected to a HART multiplexer in a rapid and automatic manner.

This and other objects and advantages are achieved In accordance with the invention by a data recording device having a multichannel HART multiplexer, the channels of which are provided with coupling members for capacitively coupling to multiple HART field devices supplied via current loops, having a HART modem downstream of the HART multiplexer and a processor that is arranged downstream of the HART modem and placed between the HART modem and a field bus interface, and which controls HART communication of the data recording device, where connected at each channel is a pulse discriminator, which detects signal pulses that are induced by the loop current on the channel being interrupted and/or switched on and are different from HART signals and on detection generates an interrupt signal for the processor, and in response to an interrupt signal, the processor is configured to terminate HART communication running on the channel in question and to generate a HART command for requesting an identification of a HART field device on the channel.

When removing or adding a field device, the current loop is opened or closed. In both cases, the current interruption or the switching on of the loop current generates a voltage peak on the channel in question of the HART multiplexer behind the capacitive coupling. While HART signals with an amplitude of approximately 1 mA peak-to-peak are modulated on the loop current, an interruption or a switching on of the loop current causes an impulse-like current change between 4 and 20 mA. Additionally, the HART modulation occurs with fixed frequencies. It is therefore possible, with the aid of the pulse discriminators, to detect signal pulses on the channels of the multiplexer that are caused by the loop current being interrupted and/or switched on. When such an event is detected, the processor (computing unit) is prompted to terminate HART communication that is possibly occurring on the channel in question, and to output a HART command, in particular the HART command 0, via this channel. If a field device has been removed, then the processor will not obtain a response once a predefined time has elapsed. The data recording device then knows that the channel in question is not occupied and can then deactivate this channel, for example, and/or report the change in the loop configuration to a higher-level entity via the field bus interface. If a field device is added for the first time or as a replacement for a previous field device, then the processor obtains an identifier, e.g., the long address, of the new field device in response to the HART command for identification and can report the configuration change to the higher-level entity.

In order to enable a secure detection of the interruption and/or switching on of the loop current, the signal pulses on the channels are discriminated with a detection threshold that can be set and moreover can be predefined for each channel or pulse discriminator individually. As already mentioned, the impulse-like current change induced by interrupting and/or switching on the loop current differs with regard to amplitude and frequency of the HART signals. Particularly in the industrial environment, it is necessary to take into consideration interference, e.g., EMC interference or poor electrical contacts, on the current loops. Consequently, it is advantageous if a frequency filtering occurs in the pulse discriminators. To this end, each pulse discriminator may each have a frequency filter, e.g., a band-pass filter, through which frequencies lying outside the HART frequency range can pass, with a downstream (threshold value) comparator, which generates the interrupt signal for the processor when the filtered signal that passes through the frequency filter exceeds the detection threshold (threshold value).

Additionally or alternatively, it is possible for a software filter to be implemented in the processor of the data recording device, which analyzes the occurrence rates of the interrupt signals obtained, in order to distinguish between interrupt signals induced by the loop current being interrupted and/or switched on and those caused by interference on the current loop. Thus, the interrupt signals induced by the loop current being interrupted and/or switched on only occur occasionally and rarely, while interrupt signals caused by EMC interference or poor contacts (loose contacts) are present more often and over a longer period of time. By distinguishing between the interrupt signals according to their possible cause, it is possible to prevent the processor from constantly generating a HART command for requesting a HART field device identification in the case of interrupt signals caused by interference and thus blocking the actual HART communication. The filtering according to occurrence rate of the interrupt signals can occur in a collective manner for all channels of the multiplexer or for the different channels according to different criteria that are predefined by the user as required. Furthermore, the detection thresholds can advantageously be modified in an adaptive manner, until the occurrence rates of interrupt signals caused by interference are minimal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below on the basis of exemplary embodiments and with reference to the figures in the drawing; viewed individually, in which.

DETAILED DESCRIPTION OF THE EXEMPLARY EMBODIMENTS

Figure 1:
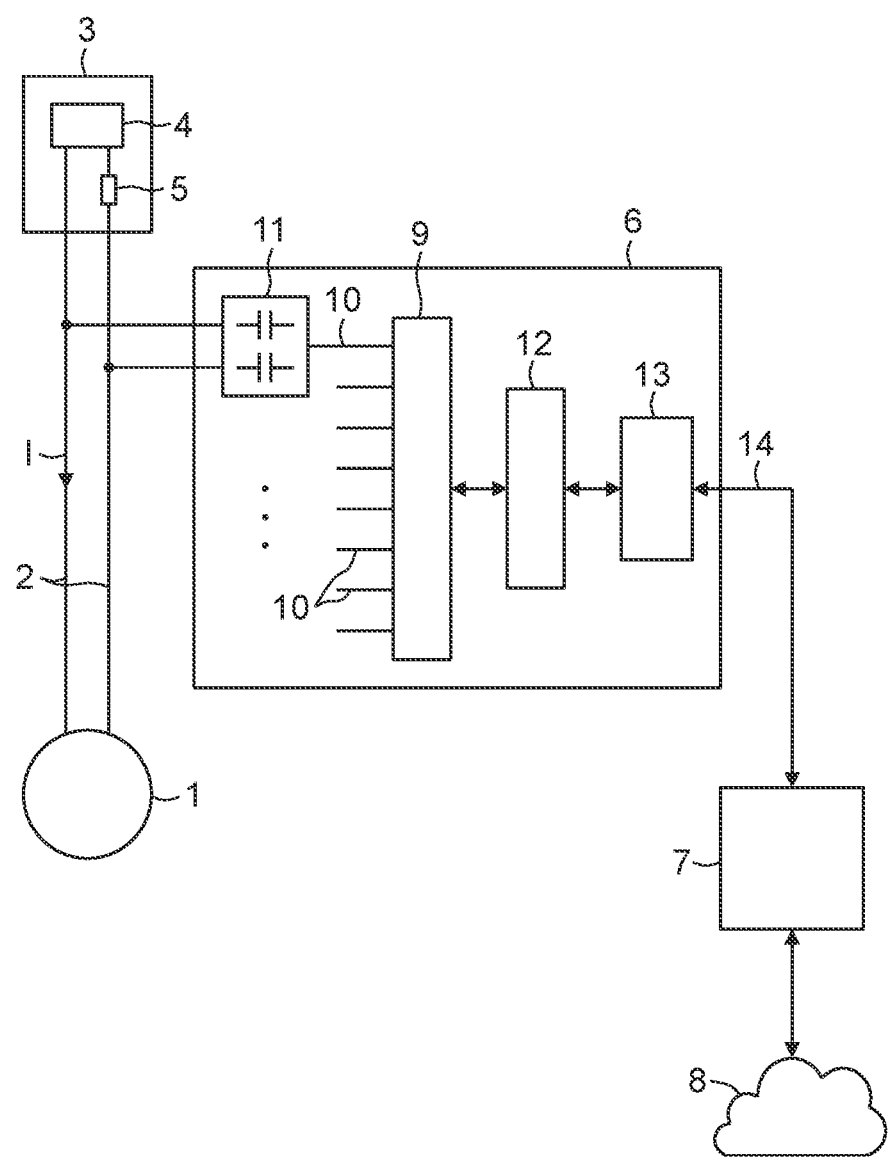
FIG. 1 is schematic diagram of an exemplary data recording device with a HART multiplexer, which concentrates the HART information from field devices and makes it available to an automation system via a standardized interface in accordance with the invention.

The same reference characters have the same meaning in the different figures. The illustrations are purely schematic and do not represent size ratios.

FIG. 1 shows a simplified schematic representation of a HART field device 1, e.g., a measuring transducer, which is connected to an input/output module 3 of an automation system (not shown here) via a current loop (two-wire line) 2. The input/output module 3 contains a voltage source 4, which supplies auxiliary power to the measuring transducer 1, where the measuring transducer 1 regulates its current consumption such that the loop current I in a range between 4 and 20 mA corresponds to the current measurement value. At a load 5 arranged in the current loop 2, a voltage that is proportional to the current I and thus to the measurement value therefore drops, the voltage being evaluated for display or further processing purposes. The voltage source 4 may also be arranged outside the input/output module 3 in a separate supply device. If the field device 1 involves an actuator, then the loop current I is regulated in the input/output module 3.

The HART field device 1 is capable of also sending and receiving digital information (HART information) in addition to the analog 4-20 mA signal. In order to send the HART information, a digital HART signal with approx. 1 mA peak-to-peak and the HART frequencies 1200 Hz for a binary one and 2200 Hz for a binary zero is superimposed onto the loop current I. It is assumed that the input/output module 3 is not HART-capable, for which reason a data recording device 6 is provided, which picks up the HART information, e.g., diagnostics data of the field device 1, from the current loop 2 and transfers the HART information to a higher-level entity, e.g., an automation system or, as shown here, via a gateway 7 to an application in a cloud system 8. Conversely, HART information, such as commands, can be transmitted from the gateway 7 to the HART field device 1 via the data recording device 6.

In order to be able to communicate digitally with multiple HART field devices 1, here up to eight for example, the data recording device 6 contains a multiplexer 9 with eight channels 10, where each channel 10 is provided with a coupling member 11 for capacitively coupling to the current loop 2 of a HART field device 1. The coupling members 11 mean that only the HART signals reach the channels 10, while the loop current I with its comparatively slow changes are kept away from the multiplexer 9. In the exemplary illustrated embodiment, for the sake of clarity, the coupling member 11 connected to the current loop 2 of a HART field device 1 is only shown for one of the channels 10. A load 5 is already present in the input/output module 3. As a result, the coupling member 11 is connected in parallel with the field device 1. Otherwise, the load 5 can be integrated in the coupling member 11, which is then connected into the current loop 2 in series.

Downstream of the HART multiplexer 9 is a HART modem 12, which demodulates HART signals obtained from the field devices 1 in time multiplex and modulates HART signals to be transmitted to the field devices 1.

Downstream of the HART modem 12 is a processor 13, which coordinates the HART communication of the data recording device 6 and establishes a connection to the gateway 7 via a standardized field bus interface, e.g., RS-485, and in so doing operates as a protocol converter for converting the HART protocol into, for example, a Modbus or Ethernet protocol and for converting the Modbus or Ethernet protocol into the HART protocol.

Figure 2:
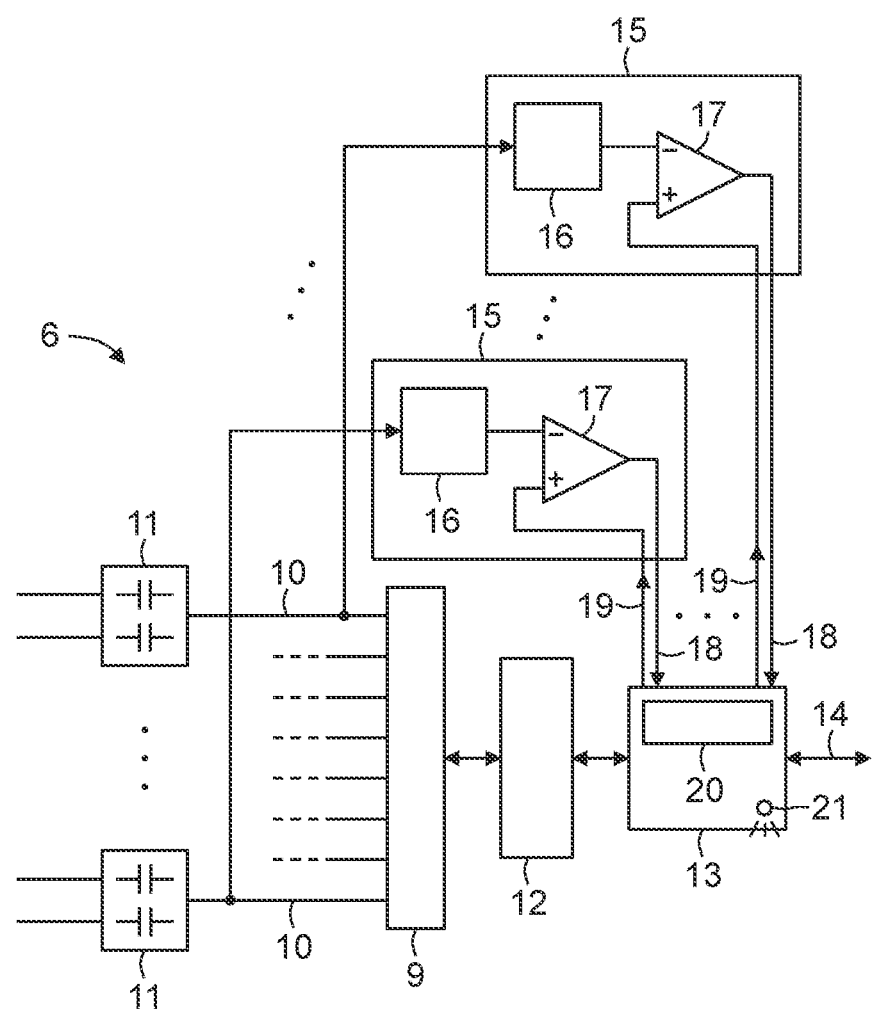
FIG. 2 is a detailed schematic diagram of the exemplary data recording device of FIG. 1.

FIG. 2 shows a more detailed example of the data recording device 6. Connected at each channel 10 is a pulse discriminator 15, which is configured to detect signal pulses on the channel 10 in question, which are induced by the loop current I on the channel 10 being interrupted and/or switched on and which differ from the HART signals. In the exemplary illustrated embodiment, each of the pulse discriminators 15 contains a frequency filter 16, through which certain frequencies lying outside the HART frequencies 1200 Hz and 2200 Hz can pass. The frequency filter 16 may involve a band-pass filter, for example. Downstream of the frequency filters 16 is a comparator 17 in each case, which generates an interrupt signal 18 for the processor 13 on the output side when the filtered signal that passes through the frequency filter 16 exceeds a detection threshold 19 in the form of a threshold value. It is possible to set this threshold 19 individually for each channel 10 or also identically for all channels 10. The processor 13 has an interrupt pin for each of the interrupt signals 18. In the exemplary illustrated embodiment, the processor 13 generates a single threshold value 19 for each comparator 17. It is also possible, however, for the processor 13 to generate a common threshold value 19 for all comparators 17.

The processor 13 furthermore contains a software filter 20, which, for each channel 10, uses the occurrence rates of the obtained interrupt signals 18 to distinguish between the interrupt signals that have probably been induced by the loop current I being interrupted and/or switched on, and other interrupt signals that are probably caused by interference on the current loop 2. Here, interrupt signals that only occur rarely and individually in those cases are identified as those that have been induced by the loop current I being interrupted and/or switched on. Interrupt signals that occur often and over a longer period of time are identified as being induced by interference on the corresponding current loops 2. As a function of the ascertained occurrence rates, the processor 13 can adaptively adjust the detection thresholds 19 in an automatic or user-guided manner, until the occurrence rates of the interrupt signals 18 caused by interference are minimal. If, for example, during ongoing operation, the occurrence rates of the interrupt signals caused by interference exceed a threshold, this can be indicated to the user, such as via an LED 21 or in another manner, or sent to the gateway 7 as diagnostics information to be forwarded.

In the case of interrupt signals that have been identified as induced by the loop current I being interrupted and/or switched on, the processor 13 first terminates HART communication, if this is currently occurring on the channel 10 in question. Following this, the processor 13 generates a HART command 0 for this channel 10, in order to request an identification from a field device 1 that may possibly be connected to the channel 10. If there is no response within a predefined time, then the processor 13 identifies the corresponding channel 10 as unoccupied. If the channel 10 was previously considered unoccupied and a response of a field device 1 is now received, then the processor 13 identifies that a new field device has been added. The configuration change on the channel identified by the processor 13 can be communicated to the gateway 7 as a "change bit" in the transferred information, in response to which the gateway 7 can read out the information regarding the configuration change, i.e., the address of a newly added field device for example, from the data recording device 6 with the highest priority.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A data recording device comprising:
a multichannel Highway Addressable Remote Transducer (HART) multiplexer, each respective channel of the multichannel HART multiplexer having coupling members for capacitive coupling to multiple HART field devices supplied via current loops;
a HART modem downstream of the HART multiplexer; and
a processor arranged downstream of the HART modem and between said HART modem and a field bus interface, said processor controlling HART communication of the data recording device;
wherein a respective pulse discriminator connected at each respective channel which detects signal pulses induced by the loop current on the respective channel being interrupted and/or switched on and which are different from HART signals and upon detection of said signal pulses generates an interrupt signal for the processor; and wherein the processor is configured to, in response to an interrupt signal, terminate HART communication running on the respective channel and to generate a HART command for requesting an identification of a HART field device on the respective channel.

2. The data recording device as claimed in claim 1, wherein each respective pulse discriminator is configured to discriminate signal pulses with a detection threshold which is settable.

3. The data recording device as claimed in claim 2, wherein the processor is configured to predefine the detection threshold on an individual basis for each respective pulse discriminator.

4. The data recording device as claimed in claim 3, wherein each respective pulse discriminator includes a frequency filter through which frequencies lying outside the HART frequency range can pass, and includes a downstream comparator which generates the interrupt signal when the signal that passes through the frequency filter exceeds the detection threshold.

5. The data recording device as claimed in claim 2, wherein each respective pulse discriminator includes a frequency filter through which frequencies lying outside the HART frequency range can pass, and includes a downstream comparator which generates the interrupt signal when the signal that passes through the frequency filter exceeds the detection threshold.

6. The data recording device as claimed in claim 5, wherein the frequency filter comprises a band-pass filter.

7. The data recording device as claimed in claim 1, wherein the processor includes a software filter, which utilizes occurrence rates of interrupt signals to distinguish between interrupt signals induced by the loop current being interrupted and/or switched on and interrupt signals induced by interference.

8. The data recording device as claimed in claim 7, wherein each respective pulse discriminator is configured to discriminate signal pulses with a detection threshold which is settable; and wherein the processor is configured to adaptively adjust detection thresholds to minimize the occurrence rates of the interrupt signals caused by interference.

* * * * *